United States Patent [19]
Finelli

[11] 3,926,919
[45] Dec. 16, 1975

[54] POLYURETHANES CHAIN-EXTENDED WITH 2,2'-DIAMINODIPHENYLDISULFIDE

[75] Inventor: Anthony F. Finelli, Akron, Ohio

[73] Assignee: The Goodyear Tire & Rubber Company, Akron, Ohio

[22] Filed: July 23, 1973

[21] Appl. No.: 381,464

[52] U.S. Cl............... 260/75 NH; 260/2 N; 260/13; 260/32.8 N; 260/33.6 UB; 260/77.5 CR; 260/77.5 AM; 260/77.5 AN
[51] Int. Cl.² ................. C08G 18/28; C08G 18/32; C08G 18/62
[58] Field of Search.... 260/75 NH, 77.5 AN, 830 P, 260/75 NH, 77.5 AM

[56] References Cited
UNITED STATES PATENTS

| | | | |
|---|---|---|---|
| 2,830,038 | 4/1958 | Pattison | 260/830 P |
| 3,158,586 | 11/1964 | Krause | 260/830 P |
| 3,188,302 | 6/1965 | Lorenz | 260/77.5 AM |
| 3,194,793 | 7/1965 | Kogon | 260/75 NH |
| 3,291,859 | 12/1966 | Tobolsky | 260/75 NH |
| 3,446,781 | 5/1969 | Brownward | 260/75 NH |
| 3,660,326 | 5/1972 | Mallabar | 260/77.5 AM |

*Primary Examiner*—H. S. Cockeram
*Attorney, Agent, or Firm*—F. W. Brunner; H. C. Young, Jr.

[57] ABSTRACT

A cured polyurethane prepared by reacting 2,2'-diaminodiphenyldisulfide with at least a part or all of excess isocyanato groups in a composition or mixture derived by the method which comprises mixing an excess of a polyisocyanate having an isocyanate functionality of 2 to 3 with a polymeric polyol having an hydroxyl functionality of 2 to 3 and a molecular weight in the range of about 500 to about 6000, and preferably in the range of about 800 to about 5000.

5 Claims, No Drawings

POLYURETHANES CHAIN-EXTENDED WITH 2,2'-DIAMINODIPHENYLDISULFIDE

This invention relates to polyurethanes. It more particularly relates to isocyanate-terminated polyol prepolymers which have been extended or cross-linked with a diamine curative.

Diamines play a unique part in shaping the characteristics and structure of polyurethanes. Their polyurethane extending, cross-linking and curing effects are typically unpredictable in a manner similar to catalysis in the hydrocarbon catalytic polymerization art.

The combination of good physical properties such as tensile and elongation along with a relatively low modulus are long sought after qualities of cured polyurethanes for practical coating and industrial product applications. A sufficiently low reaction rate between the prepolymer and the curative for such desired polyurethanes in order to enhance their processing time is also a long sought after quality. Typically, polyurethanes with good tensile and elongation can also be characterized by having medium to high moduli which is more characteristic of a plastic than a rubber. Therefore, if a rubbery polyurethane is desired, then a polyurethane must be sought with good tensile and elongation and a relatively low modulus. Discovery of a suitable curative for this purpose would be important.

The most commonly used diamine curing agents are hindered substituted aromatic diamines of which 3,3'-dichlorobenzidine (ODCB) and 4,4'-methylene-bis-(2-chloroaniline) (MOCA) are representative. To a lesser extent unhindered aromatic diamines such as 4,4'-methylenedianiline (MDA) and the phenylene diamines are used. A main advantage of the hindered diamine curing agents is their substantially longer pot life which can typically facilitate greater ease in molding operations. However, this very substantial benefit is achieved with some disadvantageous results for some purposes. For example, prepolymers of tolylene diisocyanate and a mixture of propylene adipate and tetramethylene adipate when cured with either of ODCB or MOCA have been found to yield polyurethanes with good tensile and elongation but with a modulus characteristic of a plastic rather than a rubber.

It is, therefore, an object of this invention to provide a useful cured polyurethane resulting from extending or cross-linking an isocyanate-terminated prepolymer of a polyol with a particular diamine.

In accordance with this invention a polyurethane has been discovered which is prepared by the method which comprises reacting 2,2'-diaminodiphenyldisulfide with at least a part or all of excess isocyanato groups in a composition of mixture derived by the method which comprises mixing an excess of a polyisocyanate having an isocyanate functionality of 2 to 3 with a polymeric polyol having an hydroxyl functionality of 2 to 3 and a molecular weight in the range of about 500 to about 6000, and preferably in the range of about 800 to about 5000.

More specifically, the invention is preferably a cured polyurethane prepared by reacting the 2,2'-diaminodiphenyldisulfide with a prepolymer prepared by the method which comprises reacting a polyisocyanate having an isocyanate functionality of about 2 to about 3 with a polymeric polyol having an hydroxyl functionality of about 2 to about 3 with a ratio of the isocyanate groups of the polyisocyanate to the hydroxyl groups of the polyol in the range of about 1.3 to about 12, preferably about 1.5 to about 3, and where the ratio of the amine groups of the said diamine to the excess isocyanato groups over the said hydroxyl groups is in the range of about 0.5 to about 1.1, preferably about 0.8 to about 1.0.

It should be understood that the method of preparing the polyurethane of this invention can be modified by the addition of up to about 1 to about 3 equivalents of monomeric hydrocarbon polyols having 2 to 3 hydroxyl groups and containing about 2 to about 15 carbon atoms to the said polymeric polyols. In this case, the ratio of isocyanato groups of the polyisocyanate is to the combined hydroxyl groups of the polymeric and monomeric polyols. Representative of such polyols are ethylene glycol, 1,3-propane diol, 1,4-butane diol, 1,5-pentane diol, 1,6-hexane diol and decamethylene glycol.

The polyurethane reaction mixtures used in this invention are typically liquid mixtures commonly used to prepare polyurethanes, and particularly flexible polyurethanes, by the well-known one-shot, prepolymer or semiprepolymer techniques. The materials are typically reacted at temperatures in the range of about 20° to about 150°C. and usually from about 20° to about 100°C.

Generally, the polyurethane reaction mixtures are prepared from at least one reactive hydrogen-containing polymeric material, such as the polyol, as determined by the Zerewitinoff method, at least one organic polyisocyanate and the curative. It is to be understood that the polyurethanes referred to in this specification may also contain polyurea linkages. A solvent can be used with the reaction mixture to facilitate its use in the form of a fluid mixture or solution although it is preferred to use the reaction mixture with only a minor amount of solvent, if any. If solvent is used, it can be added to form a mixture containing from about 40 to about 95 percent solids. However, a higher or lower concentration of solids can be used. When the solids concentration is low, the individual applications will deposit a thin layer of the polyurethane polymer, and a large amount of the solvent will have to be removed during the curing process. A solids concentration of 45 percent or higher is generally desired, if a solvent is used.

Other methods known to those skilled in the art of preparing polyurethane reaction mixtures with or without solvents being present may also be used.

A catalyst or accelerator can be used to facilitate the reaction which results in substantially reduced setup time, and thus enhances the thixotropic properties of the polyurethane mixture. Well-known polyurethane catalysts are useful for this purpose such as tertiary amines and the tin salts of fatty acids and also accelerators such as mercaptobenzothiazole.

The reactive hydrogen-containing polymeric material used typically comprises at least one member selected from the group consisting of polyester polyols, polyether polyols and hydroxyl-terminated unsaturated polymeric polyols. The hydroxyl-terminated unsaturated polymeric polyols typically have a molecular weight of from about 2000 to about 4000 and a hydroxyl functionality of from about 2 to about 3. The reactive hydrogen-containing material generally used, other than the hydroxyl-terminated unsaturated polymeric polyol, has a molecular weight in the range of from about 700 to about 5000, and usually from about 1000 to about 3000. (If the molecular weight of the reactive hydrogen-containing material is too low, the polyurethane will not have sufficient elasticity.) Generally, the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid and azelaic acid. The anhydrides of such acids can be used in place of the acid. If desired, from about 1 to 20 percent by weight of a triol or higher polyfunctional polyol or polyfunctional acid can be present to produce branching in the polyurethane polymer.

Further examples of polyesters are caprolactone polyesters. The caprolactone polyesters are substantially linear, hydroxyl-terminated polymers prepared by reacting a caprolactone having 6 to about 8 carbon atoms in the ring, preferably 6 carbon atoms, with a glycol having 4 to 7 carbon atoms and preferably 4 to 6 carbons. Various suitable caprolactones include $\epsilon$-caprolactone, zeta-caprolactone and eta-caprolactone. Alkyl substituted caprolactones can be used with alkyl substituents containing 1 to 2 carbon atoms selected from methyl and ethyl radicals such as methyl $\epsilon$-caprolactone. Desirably, the caprolactone polyester has a molecular weight in the range of about 800 to about 2200, preferably about 1200 to about 2100, with corresponding hydroxyl numbers in the range of about 140 to about 45 and about 95 to about 55 respectively.

Polyether polyols useful in preparing the polyurethanes of this invention can be prepared by polymerizing or copolymerizing alkylene oxides such as ethylene oxide, propylene oxide, and butylene oxides, by polymerizing or copolymerizing the low molecular weight glycols, or by the reaction of one or more such alkylene oxides with the glycols or with triol, or with a polycarboxylic acid such as phthalic acid. The polyether polyols include polyalkylenearyl ether glycols or triols, polytetramethylene ether glycols, polyalkylene etherthioether glycols or triols and alkyd resins. Generally the polytetramethylene ether glycols are the preferred polyether glycols.

It is usually preferred that the hydroxyl-terminated unsaturated polymeric polyol has a molecular weight of from about 2000 to about 4000 and a corresponding hydroxyl number of from about 50 to about 25. The hydroxyl-terminated unsaturated polymeric polyols used in this invention are unsaturated polymers of the type prepared by polymerizing unsaturated monomers comprising from about 70 to about 100 percent conjugated dienes selected from the group consisting of 1,3-butadiene and isoprene and up to about 30 percent sytrene with the aid of organic peroxy catalysts to provide polymers which are generally terminated at both ends of their chain with hydroxyl groups and have a hydroxyl functionality of from about 2 to about 3 and usually from about 2.1 to about 2.8. The preferred hydroxyl-containing polymeric polyols are polybutadiene polyols, polyisoprene polyols, butadiene-styrene copolymer polyols having about 80 to 90 percent units derived from butadiene and about 20 to 10 percent units derived from styrene and also butadiene-acrylonitrile copolymer polyols.

The organic polyisocyanates used in this invention include various organic diisocyanates and mixtures thereof. The organic polyisocyanates can be aromatic, aliphatic or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate), 3,3'-dimethyl-4,4'-diphenylmethane diisocyanate and 1,5-tetrahydronaphthalene diisocyanate and mixtures of such diisocyanates. For the purposes of the present invention, the toluene diisocyanates, diphenylmethane-4,4'-diisocyanate, 3,3'-dimethyl-4,4'-bis-phenylene diisocyanate, 4,4'-methylene-bis(cyclohexylisocyanate) and 3,3'-dimethyl-4,4'-diphenylmethane diisocyanate are preferred. For convenience, these diisocyanates are referred to as TDI, MDI, TODI, $H_{12}$MDI and DMMDI, respectively.

Various non-reactive solvents known to those skilled in the polyurethane art can be used for the preparation of the prepolymer solutions and polyurethane reaction mixtures, if a solvent is desired. Representative examples of the solvents are aromatic solvents such as benzene, xylene and toluene and the liquid lower ketones such as acetone, methyl ethyl ketone, methyl isobutyl ketone and diisobutyl ketone. If the polyurethane reaction mixtures are to be used to prepare the cured polyurethanes in confined areas which are subject to explosive hazards, nonflammable chlorinated solvents can be used to form nonflammable polyurethane reaction mixtures. Mixtures of solvents may also be used to obtain satisfactory spreading properties and evaporation rates when the polyurethane spray composition is applied to a polymeric surface.

To enhance the cured polyurethane's hydrolysis resistance, about 1 to about 15, preferably about 2 to about 5, weight percent of an epoxy resin and at least sufficient to give an excess of epoxide groups relative to the total excess of amino groups of the diamine curative over the said excess isocyanato groups.

Thus, an excess of epoxide groups is required over the excess amino and/or hydroxyl groups of the curative, such as at least about 5 to about 50 equivalent percent excess, based on two epoxy groups per amino ($-NH_2$) group, to provide a polyurethane composition containing sufficient free epoxide groups.

Hydrolysis resistance is typically determined by immersion in distilled water at 158°F. A substantial retention of tensile strength and elongation after 12 days immersion can be related to a substantial resistance to hydrolysis. The tensile and elongation are normally determined at about 25°C. by methods typically used by those skilled in the art.

Typical epoxy resin compounds can be used in this invention and are well known to those skilled in the epoxy resin art. The general characteristic of this class of material is the presence of epoxy groups, which are of the formula:

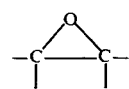

Ordinarily, epoxy resins contain a plurality of terminal epoxy groups. Usually epoxy resins are of moderately high molecular weight, containing more than 10, and usually more than 20 carbon atoms per molecule, although in this invention epoxy compounds containing fewer carbons may be used.

The epoxy group content of such resins is usually expressed as the epoxide equivalent or grams of resin containing a gram equivalent of epoxide. The equivalent of a commercial resin is generally expressed as a range, such as 125–175, 150–200, etc. Epoxy resins having low epoxide equivalents, in the range of from about 125 to about 250, are usually preferred because of their lower viscosities, although higher equivalents, including 125 to about 525 with melting points up to about 75°C., offer advantages where viscosity is not a factor.

Epoxy resins are typically prepared by reaction of a polyfunctional epoxy compound with a compound containing two or more hydroxy radicals, producing epoxy resins comprising one or more ether linkages, joining organic radicals and terminating in epoxy groups.

The members of a preferred class of epoxy resins for use in the process of this invention are the products of reactions of polyfunctional epoxy compounds with aromatic polyhydric phenolic compounds. The polyfunctional epoxy compound used in this connection may be a diepoxide, distinguished from the class of epoxy resins by its relatively low molecular weight, illustrative of which are diepoxybutadiene, and bis(2,3-epoxy-2-methylpropyl)ether. More usually, the polyfunctional epoxy compound is a haloepoxy compound, most commonly, epichlorhydrin. Reaction of epichlorhydrin, for example, with an aromatic polyhydric phenolic compound results in the formation of a polymer containing ether linkages between arylene radicals derived from the initial aromatic polyhydric compound and hydroxy-alkylene radicals derived from the initial haloepoxy compound, the polymers terminating in epoxyalkyl radicals. The aromatic polyhydric compound may comprise a monocyclic phenol such as a resorcinol, a polycyclic phenol such as p,p¹-(dihydroxy)-bisphenol, or phenolic resin such as a phenol-formaldehyde resin. In particular, there are preferred in the process of this invention, epoxy resins derived from the reaction of epichlorhydrin and bisphenols. Illustrative of various suitable bisphenols are, for example, p,p¹-oxybisphenol, p,p¹-methylene bisphenol, 2,2-bis(4-hydroxyphenyl)propane, 2,2-bis(4-hydroxy-2-methylphenyl)propane, 2,2-bis(2-t-butyl-4-hydroxyphenol)propane, 2,2-bis(2,5-dimethyl-4-hydroxyphenyl)propane, 2,2-bis(2-chloro-4-hydroxyphenyl)propane, 2,2-bis(2-bromo-6-fluoro-4-hydroxyphenyl)propane, 1,1-bis(4-hydroxyphenyl)ethane, 1,1-bis(4-hydroxyphenyl)isobutane, 1,1-bis(2-isopropyl-4-hydroxyphenyl)isobutane, 2,2-bis(4-hydroxyphenyl)butane, 4,4-bis(4-hydroxyphenyl)heptane, 1,1-bis(4-hydroxyphenyl)dodecane, and 2,2-bis(4-hydroxyphenyl)hexadecane.

Preferred resins for this invention are derived from epichlorhydrin and 2,2-bis(4-hydroxyphenyl)propane with an epoxide equivalency of about 150 to about 220, preferably about 175 to about 210. Resins which are pourable liquids at about 25°C. are preferred but others can be used in solution. Typical resins are those obtainable under the tradenames Epon 828 and Epon 1001 from the Shell Chemical Company.

Further illustrative examples of suitable epoxy resins and methods of preparation may be found in U.S. Pat. No. 3,350,406.

The practice of this invention is further illustrated by reference to the following examples which are intended to be representative rather than restrictive of the scope of the invention. Unless otherwise indicated, all parts and percentages are by weight.

EXAMPLE I

A prepolymer was prepared by reacting 100 parts 80-ethylene-20-propylene adipate of 1800 molecular weight, 200 parts tetramethylene adipate of 2000 molecular weight and an amount of 80/20 mole ratio of 2,4/2,6-tolylene diisocyanate to yield an isocyanate/hydroxyl mole ratio of 2:1.

The prepolymer was diluted in toluene, methyl ethyl ketone and 10 percent cellulose acetate butyrate in methyl ethyl ketone as follows: 100/30/30/5. The diluted prepolymer analyzed 2.0 weight percent excess isocyanato groups (NCO) based on the solution. An extender solution was prepared from 2.4 parts 2,2'-diaminodiphenyldisulfide in 6 parts methyl ethyl ketone. This was added to 50 parts diluted prepolymer. A film was drawn on a polyethylene slab and allowed to stand at room temperature (about 25°C.) to evaporate the solvents. The film was then placed in an oven at 50°C. for 16 hours. The film showed the following physical properties as determined at about 25°C. by methods normally used by those having skill in the rubber testing art.

Table 1

| | |
|---|---|
| Tensile (pounds per square inch) | 5800 |
| Elongation (%) | 660 |
| Thickness (inches) | 0.016 |
| Modulus (psi): | |
| 100 percent | 500 |
| 300 percent | 900 |
| 500 percent | 2300 |
| After 3 days in water at 158°F: | |
| Tensile/Elongation | 2700/740 |
| After 3 days in water at 180°F: | |
| Tensile/Elongation | 1400/670 |
| Volume change in 70/30 isooctane/ toluene (4 days at about 25°C.) | 16.1 |

2,2'-diaminodiphenyldisulfide shows a substantially lower modulus than the elastomer from MOCA extension prepared according to the method of Example I but substituting MOCA for the 2,2'-diaminodiphenyldisulfide as shown in Table 2.

Table 2

| | |
|---|---|
| Tensile (psi) | 5800 |
| Elongation (%) | 630 |
| Thickness (inches) | 0.016 |
| Modulus (psi): | |
| 100 percent | 700 |
| 300 percent | 1300 |
| 500 percent | 3300 |

EXAMPLE II

A prepolymer was made and diluted as in Example I and then cured with various amounts of 2,2'-diaminodiphenyldisulfide. The make up is shown in Table 3. Films were drawn on polyethylene slabs, allowed to cure at room temperature and identified in Table 4 as samples I, II and III.

Table 3

|  | I | II | III |
|---|---|---|---|
| Diluted prepolymer | 50 | 50 | 50 |
| 2,2'-Diaminodiphenyl-disulfide | 2.9 | 2.6 | 2.9 |
| 2-Mercaptobenzothiazole | 0.5 | 0.5 | 1.0 |
| Methyl ethyl ketone | 6.0 | 6.0 | 6.0 |
| Pot life (minutes) | 80 | 74 | 58 |

The 2-mercaptobenzothiazole helps to speed the reaction and lessen the long pot life.

Table 4

|  | I | II | III |
|---|---|---|---|
| Tensile (psi) | 4000 | 3000 | 2300 |
| Elongation (%) | 730 | 600 | 750 |
| Thickness (inches) | 0.025 | 0.018 | 0.017 |
| Modulus (psi) |  |  |  |
| 100 percent | 600 | 600 | 500 |
| 300 percent | 800 | 900 | 800 |
| Crescent tear (lbs/in) | 355 | 295 | 325 |
| After 3 days in water at 180°F: |  |  |  |
| Tensile/Elongation | 1300/710 | 1050/740 | 1000/575 |
| Volume change in 70/30 isooctane/toluene for 4 days at about 25°C. | 16.2 | 16.2 | 15.6 |

EXAMPLE III

The prepolymer from Example I at 3.6 percent free or excess NCO was used in a molten casting with the 2,2'-diaminodiphenyldisulfide mixed with 80-ethylene-20-propylene adipate according to the following recipe:

| Polyester prepolymer | 200 parts |
|---|---|
| 2,2'-diaminodiphenyldisulfide | 18.0 parts |
| 80-ethylene-20-propylene adipate (1800 molecular weight) | 15.0 parts |

The prepolymer and diamine in polyester were heated to 220°F. and mixed. The mixture had a pot life greater than 5 to 6 minutes and was used to pour a sheet inside a metal mold. The casting was heated 16 hours at 158°F.

On cooling the rubber sheet showed a Shore A hardness of 67 and the following physicals as shown in Table 5:

Table 5

| Tensile (psi) | 3000 |
|---|---|
| Elongation (%) | 680 |
| Modulus (psi): |  |
| 100 percent | 400 |
| 300 percent | 550 |
| Crescent tear (lbs/in) | 225 |
| After 3 days in water at 158°F: |  |
| Tensile/Elongation | 2000/805 |
| Gehman low temperature torsion test $T_2/5/10/100°C$. | −17°/−24°/−26°/−33° |

The sample showed exceptional flex properties in the Ross Flex Test:

| Number of flexes | 413,048 |
|---|---|
| Rating | 1 (no growth in hole) |
| Volume change in 70/30 isooctane/toluene for 4 days at room temperature | 17.8% |

EXAMPLE IV

A casting for cure at room temperature was made from the prepolymer of Example I and 2,2'-diaminodiphenyldisulfide in polyester according to the following recipe as shown in Table 6.

Table 6

| Prepolymer | 200 parts |
|---|---|
| 2,2'-diaminodiphenyldisulfide | 18.5 |
| 80-ethylene-20-propylene adipate (1800 molecular weight) | 20 |

The molten prepolymer was at 180°F. and the molten diamine/polyester was at 220°F. The mix was used to cast a tensile sheet. It was allowed to cure at room temperature. The material showed a Shore A hardness of 81 and a tensile (psi)/elongation (%) of 3700/690.

While certain representative embodiments and details have been shown for the purpose of illustrating the invention, it will be apparent to those skilled in this art that various changes and modifications may be made therein without departing from the spirit or scope of the invention.

What is claimed is:

1. A cured polyurethane prepared by the method which comprises curing a composition derived by the method which comprises mixing an excess of a polyisocyanate having an isocyanate functionality of 2 to 3 with a polymeric polyol having an hydroxyl functionality of 2 to 3 and a molecular weight in the range of about 500 to about 6000 by reacting therewith, the primary diamine, 2,2'-diaminodiphenyldisulfide at a temperature in the range of about 20°C to about 150°C, where the ratio of isocyanato groups of the polyisocyanate to the hydroxyl groups of the polymeric polyol is in the range of about 1.3 to about 12 and where the ratio of amine groups of said 2,2'-diaminodiphenyldisulfide to excess isocyanato groups of said polyisocyanate over hydroxyl groups of said polymeric polyol is in the range of about 0.5 to about 1.1.

2. The cured polyurethane of claim 1 prepared by reacting 2,2'-diaminodiphenyldisulfide with a prepolymer prepared by the method which comprises reacting a polyisocyanate having an isocyanate functionality of about 2 to about 3 with a polymeric polyol having an hydroxyl functionality of about 2 to about 3 with a ratio of the isocyanato groups of the polyisocyanate to the hydroxyl groups of the polyol in the range of about 1.3 to about 12, and where the ratio of the amine groups of the said diamine to the excess isocyanato groups over the said hydroxyl groups is in the range of about 0.5 to about 1.1.

3. The cured polyurethane of claim 1 modified by the addition of up to 1 to about 3 equivalents of monomeric hydrocarbon polyols having 2 to 3 hydroxyl groups and containing 2 to about 15 carbon atoms.

4. The cured polyurethane of claim 1 prepared by reacting the materials at a temperature in the range of about 20° to about 150°C., where the ratio of the isocyanato groups of the polyisocyanate to the hydroxyl groups of the polymeric polyol is in the range of about 1.5 to about 3, where the ratio of the amino groups of said diamine to excess isocyanato groups of said hydroxyl groups is in the range of about 0.8 to about 1.0, where said polyisocyanates are selected from toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate), 3,3'-dimethyl-4,4'-diphenylmethane diisocyanate and 1,5-tetrahydronaphthalene diisocyanate and mixtures of such diisocyanates and where the polymeric polyols are selected from at least one of the group consisting of polyester polyols, polyether polyols and hydroxyl-terminated unsaturated polymeric polyols.

5. The cured polyurethane according to claim 4 where the polyester polyols have a molecular weight in the range of about 1000 to about 3000 and are selected from condensation products of low molecular weight glycols and organic dicarboxylic acids and from caprolactone polyesters derived from ϵ-caprolactone and a glycol containing 4 to 6 carbon atoms, where the polyether polyols have a molecular weight in the range of about 1000 to about 3000 and are selected from polyols prepared by polymerizing or copolymerizing alkylene oxides, by polymerizing or copolymerizing low molecular weight glycols or by the reaction of alkylene oxides with low molecular weight glycols and where said hydroxyl-terminated unsaturated polymeric polyols have a molecular weight in the range of about 2000 to about 4000 with an hydroxyl functionality of about 2 to 3 of the type prepared by polymerizing unsaturated monomers comprising from about 70 to about 100 percent conjugated dienes selected from 1,3-butadiene and isoprene and up to about 30 percent sytrene.

* * * * *